United States Patent [19]

Burger et al.

[11] Patent Number: 4,846,856
[45] Date of Patent: Jul. 11, 1989

[54] CIRCULATING AIR SCRUBBER

[76] Inventors: Thomas F. Burger, Wolfratshauser Str. 45j, D-8023 Pullach, Fed. Rep. of Germany; David M. Collins; Stephen M. Collins, both of 27A Woodlands Avenue, Emerson Park, Hornchurch, Essex, England; Manfred R. Burger, Wolfratshauser Str. 45j, D-8023 Pullach, Fed. Rep. of Germany

[21] Appl. No.: 186,060

[22] Filed: Apr. 25, 1988

[30] Foreign Application Priority Data

Apr. 23, 1987 [DE] Fed. Rep. of Germany ....... 3713651

[51] Int. Cl.$^4$ ............................................. B03C 3/36
[52] U.S. Cl. ........................................ 55/106; 55/107; 55/122; 55/127; 55/227
[58] Field of Search .......... 55/106, 107, 122, 124–127, 55/227, 235

[56] References Cited

U.S. PATENT DOCUMENTS

| 2,949,168 | 8/1960 | Peterson | 55/124 X |
| 3,389,971 | 6/1968 | Alliger | 55/122 X |
| 3,440,799 | 4/1969 | Romell | 55/107 |
| 3,533,222 | 10/1970 | Gasperini | 55/124 |
| 3,783,588 | 1/1974 | Hudis | 55/126 |
| 3,898,060 | 8/1975 | Starbuck | 55/126 X |
| 4,202,674 | 5/1980 | Rodenberger et al. | 55/124 X |
| 4,308,037 | 12/1981 | Meissner et al. | 55/107 X |
| 4,619,670 | 10/1986 | Malcolm et al. | 55/122 X |
| 4,649,703 | 3/1987 | Dettling et al. | 55/127 X |
| 4,689,951 | 9/1987 | Polach | 55/127 X |

FOREIGN PATENT DOCUMENTS

| 1960097 | 6/1971 | Fed. Rep. of Germany | 55/127 |
| 770619 | 9/1934 | France | 55/122 |
| 978923 | 12/1982 | U.S.S.R. | 55/126 |

Primary Examiner—Robert Spitzer
Attorney, Agent, or Firm—Norman E. Brunell

[57] ABSTRACT

An ultrasonic circulating air brush scrubber with a supply of scrubbing liquid in finely dispersed form in the intake air stream, and a high-voltage ionizer, includes at least one circular brush downstream of the ionizer. The brush is driven at high speed and is at the opposite potential from the ionized air stream. The circulating air scrubber provides a high degree of cleaning action for particle sizes down to below 1 μm., low consumption of scrubbing liquid and dries the air on the output side.

14 Claims, 1 Drawing Sheet

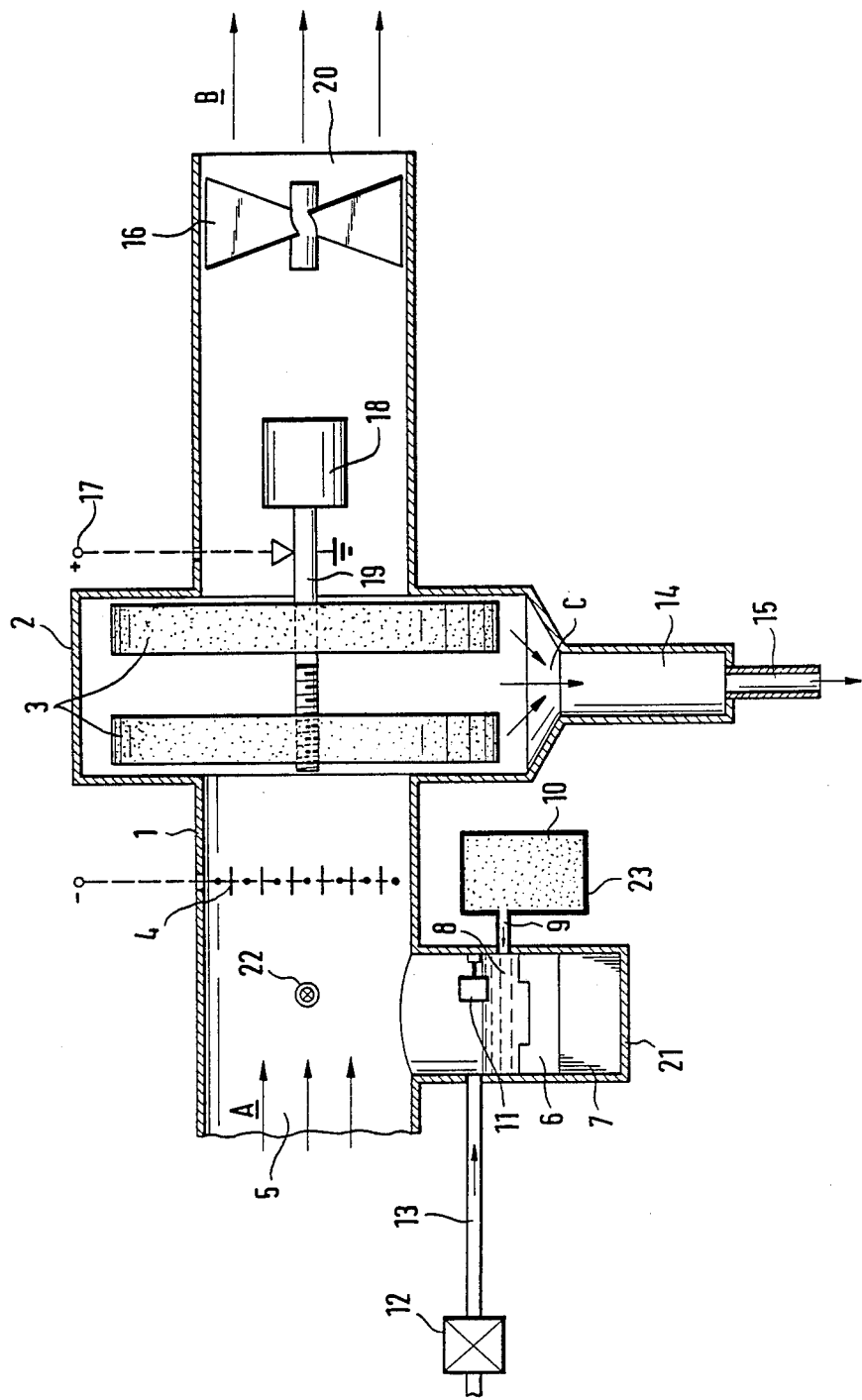

4,846,856

CIRCULATING AIR SCRUBBER

BACKGROUND OF THE INVENTION

The present invention relates generally to an improved scrubber for cleaning streams of gas laden with toxic solid, liquid or gas contaminants. Specifically, this invention relates to a circulating air scrubber.

Scrubbers for cleaning streams of gas, especially air, laden for example with toxic solid particles and with poisons in gas or liquid phase are known in various embodiments. In conventional scrubbers, a cleaning or scrubbing liquid in finely sprayed, vaporized or atomized form in added to the gas stream laden with contaminants. Generally water is used with the addition of an additive, especially one with a chemical absorbing action, such as alcohol, gas solvents, neutralizing substances, and the like.

After thorough mixing, for example by vortexing, the harmful materials are extracted from the laden gas stream, captured in a filter device and/or condensation arrangement, and removed. Disposal of the resulting accumulations of contaminated scrubbing liquid is a substantial problem with conventional devices.

In conventional air scrubbers, the gas is at 100% relative humidity because of the temperature in the condensation region. This can readily be seen from the known Mollier diagram. For example, at normal ambient temperatures, 3 $m^3$ of scrubbing liquid are needed for each 1,000 $m^3/h$ or air. In the continuous cleaning of a larger space, for instance, in a chemical plant in which toxic gases or dust particles arise on a larger scale, a correspondingly large quantity of contaminated scrubbing liquid is accumulated for disposal.

Operation of conventional scrubbers with circulating air is expensive because the gas stream to be cleaned must be cooled, in order to ensure condensation of the scrubbing liquid.

Furthermore, conventional air scrubbers can only remove solid materials to a particle size of about 10 to 50 $\mu m$. For smaller particle sizes an additional cleaning device is necessary, such as an electrostatically operated active carbon filter.

The object of the present invention is to provide a circulating air scrubber which requires relatively very little scrubbing liquid, is suitable for removal of very small solid particles in the range of 5 $\mu m$ and below, and is suitable for operation with circulating air.

SUMMARY OF THE INVENTION

A circulating air scrubber according to the present invention includes means for supplying a scrubbing liquid in finely divided form into the air stream, a high-voltage ionizer for the air stream, means for removing the contaminated scrubbing liquid, means for propelling the air stream, and at least one circular brush, mounted for rotation along an axis substantially parallel to the air stream, positioned downstream stream from the ionizer. The brush has an electrical potential opposite to the ionizing potential and can be driven at so high a speed that, in addition to electrostatic removal, condensation of the contaminated scrubbing liquid occurs on or in the brush.

A plurality of drum or disc-shaped circular brushes can be used, one behind the other, on a common driving shaft. The speed of rotation is preferably controlled in response to the relative humidity of the contaminated gas stream monitored in the intake region by a humidity sensor.

In an alternate embodiment, a plurality of circular brushes supported on coaxial shafts and driven at different speeds may be used.

BRIEF DESCRIPTION OF THE DRAWING

The FIGURE is a sectional view of an air scrubber according to the invention, suitable for operation with circulating air.

DETAILED DESCRIPTION OF THE PREFERRED EMBODIMENT

The air scrubber according to the present invention requires only relatively very small quantities of scrubbing liquid and is therefore well suited for operation with circulating air. Particles in the size range below 1 $\mu m$ can be removed and toxic gases will be absorbed and removed by the additional condensation effect.

In accordance with the present invention electrical removal or electrostatic absorbing action occurs because the brush(es) are at the opposite potential to the ionization. In addition, because of the relatively high rotational speed of the brushes, the vapor or particles of moisture of the contaminated scrubbing liquid are mechanically removed from the air stream by condensation caused by the extreme deflection and acceleration of the flow near the brush.

Downstream of the brush, the cleaned air is practically dry and additional condensation for removal of the scrubbing liquid is not needed even when there is a very high relative humidity present on the gas inlet side.

Further, an air scrubber according to the present invention uses only a relatively very small quantity of scrubbing liquid. Tests have shown that about 2 to 3 liters of scrubbing liquid per 1,000 $m^3/h$ of air are generally sufficient. This dramatically reduces disposal problems by reducing the volume of contaminated scrubbing liquid produced.

Referring now to the Figure, housing 1 of a circulating air scrubber according to the present invention may be constructed in the form of a tube with an axial, flange-like enlargement 2. Inlet air stream A laden with harmful material enters intake region 5, propelled by suction/compression fan 16. Cleaned air stream B exits at exhaust 20.

Conventional electrostatic ionization device 4 is stretched across air stream A in intake region 5, secured with insulation in housing 1, and are connected for example to the negative pole of a high-voltage source (not shown). The ionization voltage preferably lies in the region from 12 kV to about 30 kV. Experiments have shown that an ionization voltage in the region of about 15 kV provides good results for an air cleaning apparatus with a through-flow volume of about 1,000 $m^3/h$.

Upstream of ionization device 4, nearer intake region 5, is a source of scrubbing liquid including the following parts and subassemblies: supply passage 13 for water with automatically operable supply valve 12, atomizer 6 (which may be a heater for generating a vapor of scrubbing liquid or an ultrasonic spray head), positioned below the surface of scrubbing liquid 8 in container 21 which is open towards inlet stream A, conventional control device 7 for atomizer 6, liquid surface detector 11 which may conveniently be a float sensor for inlet supply valve 12, and container 23 for additive 10 which is supplied in dispensed amounts into scrubbing liquid 8 via passage 9.

The dispensing rate is matched to the water supplied via passage 13, as determined by float 11. Scrubbing liquid 8, provided with additives 10, which may be absorbing toxic gases, reaches inlet air stream A, after having been atomized by atomizer 6.

The particles of scrubbing liquid 8 and the particles of harmful material in air stream A are ionized by ionization device 4 and then, under the action of fan 16, arrive in the axially enlarged region 2 which includes circular brushes 3. Circular brushes 3 are driven by driving motor 18 at high speed via common shaft 19 which is aligned substantially parallel to the air stream. The speed of shaft 19 and therefore of circular brushes 3 lies in the region of 1,000 to 20,000 rpm, preferably at an average speed of between 1,400 and 3,000 rpm or between 4,000 and 6,000 rpm.

This speed is preferably controlled in response to the relative humidity as measured by humidity probe 22 positioned in air inlet region A. It is also possible, and advantageous for condensation, to drive two circular brushes 3 at different speeds. In this case the downstream circular brush, that is the one lying nearer to driving motor 18, may be driven by a hollow axle or shaft, not shown, at a higher speed, while the upstream circular brush, nearer air inlet 5, is driven at lower speed by a solid shaft passing through the center of the hollow shaft, via a step-down gear arrangement, not shown.

Circular brushes 3 are subjected to an electrical potential opposite to the ionization potential at ionizer 4. This may be accomplished, for example, by connecting drive shaft 19 to the opposite pole of the high-voltage source, not shown, for example by grounding shaft 19.

Circular brushes 3 may conveniently be constructed from materials suited for high acceleration forces, especially certain polyamide plastics materials, which can behave on the surface at least slightly as a conductor. This last-mentioned requirement is satisfied by all brush materials tested.

The scrubbing liquid particles laden with harmful material, which have been condensed by the high-speed rotation of brushes 3 and/or have been accelerated outwards, are collected at funnel C in the lower region of axial enlargement 2, and are removed for disposal via collector 14 and discharge passage 15.

The action of the gas scrubbing arrangement according to the invention, which can also be called an "ultrasonic circulating air brush scrubber with ionization arrangement" is twofold. On the one hand, brushes 3 act with electrostatic attraction on the ionized air laden with harmful material and with scrubbing liquid. On the other hand brushes 3, driven at comparatively high speed, act as a condensation arrangement and as a centrifuge on the laden air particles or gases. By the sharp deflection of the flow in the region of brushes 3 and the acceleration, an extremely high g force is attained, so that the scrubbing liquid cloud or vapor, laden with particles of harmful material or with toxic gases, is condensed, with simultaneous unloading, and is moved radially outwards and led away.

We claim:

1. An improved gas scrubber for removing contaminants from a gas of the type having a housing with an inlet and an outlet, means for propelling the gas in a stream therebetween, means for supplying a scrubbing liquid is finely divided form into the gas stream, means for applying an ionization potential to the gas stream, and means for removing the contaminated scrubbing liquid, wherein the improvement comprises:

brush means positioned downstream from the ionization means and mounted for rotation about an axis parallel with the gas stream;

means for rotating the brush means; and means for connecting the brush means to an ionization potential opposite the potential applied to the gas stream.

2. A gas scrubber according to claim 1, further comprising:

an axial enlargement of the gas stream in the housing surrounding the brush means.

3. A gas scrubber according to claim 2, wherein the axial enlargement further comprising:

means for collecting and removing contaminated scrubbing liquid deflected from the gas stream by the brush means.

4. A gas scrubber according to claim 1, further comprising:

ultrasonic sprayer means for atomizing the scrubbing liquid and for dispersing the scrubbing liquid into the gas stream.

5. A gas scrubber according to claim 1, further comprising:

means for vaporizing the scrubbing liquid and for dispersing the scrubbing liquid into the gas stream.

6. A gas scrubber according to claim 1, further comprising:

means for dispersing an additive into the scrubbing liquid.

7. A gas scrubber according to claim 1, wherein the bursh means further comprises:

a plurality of circular brushes arranged axially one behind the other.

8. A gas scrubber according to claim 7, wherein the brush means further comprises:

a common driving shaft on which the brushes are mounted.

9. A gas scrubber according to claim 7, wherein the brush means further comprises:

means for driving the brushes at different speeds.

10. A gas scrubber according to claim 7, further comprising:

means for controlling the rotational speed of the brushes in accordance with the humidity of the gas stream.

11. A gas scrubber according to claim 10, wherein the speed of the rotation of the circular brushes is in the region of 1,000 to 20,000 rpm.

12. A gas scrubber according to claim 11, wherein the average speed of the rotation of the circular brushes is in the range of 1,400 to 3,000 rpm.

13. A gas scrubber according to claim 11, wherein the average speed of the rotation of the circular brushes is in the range of 4,000 to 6,000 rpm.

14. A gas scrubber according to claim 1, further comprising:

means for maintaining a reservoir of scrubbing liquid.

* * * * *